(12) United States Patent
Ho et al.

(10) Patent No.: US 9,077,514 B1
(45) Date of Patent: Jul. 7, 2015

(54) METHODS AND STRUCTURES FOR COMPENSATING AND TRACKING PROCESS, VOLTAGE AND TEMPERATURE VARIATIONS

(71) Applicant: Altera Corporation, San Jose, CA (US)

(72) Inventors: Chi Mun Ho, Bayan Lepas (MY); Kin Hong Au, Perai (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/166,252

(22) Filed: Jan. 28, 2014

(51) Int. Cl.
*H04L 7/06* (2006.01)
*H04L 7/04* (2006.01)

(52) U.S. Cl.
CPC .......................................... *H04L 7/04* (2013.01)

(58) Field of Classification Search
CPC ........... G11C 7/222; G11C 7/22; G11C 7/225
USPC ......................................... 375/354, 355, 371
See application file for complete search history.

(56) References Cited

U.S. PATENT DOCUMENTS

| | | |
|---|---|---|
| 5,548,797 A | 8/1996 | Arimilli et al. |
| 5,623,216 A | 4/1997 | Penza et al. |
| 6,172,490 B1 | 1/2001 | Antoszkiewicz |
| 6,288,523 B2 | 9/2001 | Antoszkiewicz |
| 6,615,027 B1 | 9/2003 | Sahota et al. |
| 8,078,122 B2 | 12/2011 | Sahota et al. |
| 8,589,716 B2 | 11/2013 | Chen et al. |
| 2009/0147888 A1* | 6/2009 | Felix et al. .................... 375/340 |

* cited by examiner

*Primary Examiner* — Kevin Kim

(57) ABSTRACT

An integrated circuit having a clock synchronizing circuit is described. The clock synchronizing circuit includes an input-output buffer and a plurality of sampling buffer circuits. The input-output buffer receives an input signal and generating an output signal. Each sampling buffer circuit receives the output signal and a sampling clock signal. Each sampling buffer circuit generates a first sampled output by sampling the output signal at the rising edge of the corresponding sampling clock signal and a second sampled output by sampling the output signal on the falling edge of the corresponding sampling clock signal. The sampling clock signal has a predetermined phase difference at each of the plurality of sampling buffer circuits.

20 Claims, 8 Drawing Sheets

METHODS AND STRUCTURES FOR COMPENSATING AND TRACKING PROCESS, VOLTAGE AND TEMPERATURE VARIATIONS

BACKGROUND

A memory interface circuit on an integrated circuit is utilized for communicating with a memory device. Generally, data communication between an integrated circuit and a memory device may be classified as either a read memory cycle or a write memory cycle. When reading from a memory device, the memory interface circuit may capture incoming data using a data capture strobe. The data capture strobe triggers the integrated circuit to read logic states of the incoming data. Generally, the data capture strobe is asserted close to the middle of the incoming data stream (e.g., in the middle of the incoming data eye or data window) so that appropriate data is sampled.

Typically, the data capture strobe is generated according to the rising or falling edges of a clock signal. However, the data capture strobe may shift unpredictably due to variations in the process, voltage and temperature (PVT) of the integrated circuit. The shift may cause the integrated circuit to fail to accurately capture the incoming data.

Therefore, most of the memory interface circuits include a tracking circuit that monitors unwanted transitions in the data capture strobe and subsequently corrects the transitions (if any). The tracking circuit may use different phase clock signals to perform sequential sampling of the data capture strobe before determining an optimum phase shift for the clock signal. However, tracking circuits using sequential sampling are generally slow and unable to react quickly to the transitions in the data capture strobe. There are other types of tracking circuits that may be relatively quicker in sampling data compared to tracking circuits with sequential sampling. However, the implementation of such tracking circuits may be costly and may require a larger die area.

It is within this context that the embodiments described herein arise.

SUMMARY

Embodiments described herein include methods and structures for compensating and tracking process, voltage and temperature variations. It should be appreciated that the embodiments can be implemented in numerous ways, such as a process, an apparatus, a system, a device, or a method. Several embodiments are described below.

In one embodiment, an integrated circuit having a clock synchronizing circuit is described. The clock synchronizing circuit includes an input-output buffer and a plurality of sampling buffer circuits. The input-output buffer receives an input signal and generating an output signal. Each sampling buffer circuit receives the output signal and a sampling clock signal. Each sampling buffer circuit generates a first sampled output by sampling the output signal at the rising edge of the corresponding sampling clock signal and a second sampled output by sampling the output signal on the falling edge of the corresponding sampling clock signal. The sampling clock signal has a predetermined phase difference at each of the plurality of sampling buffer circuits.

In another embodiment, a method of operating a clock synchronizing circuit on an integrated circuit is described. The method includes a step to receive a strobe signal at input terminals of a plurality of sampling buffer circuits. The method also includes a step to receive out-of-phase sampling clock signals at each of the plurality of sampling buffer circuits. The method further includes a step to sample the strobe signal at rising and falling edges of the corresponding sampling clock signal.

In an alternative embodiment, another method of operating a clock synchronizing circuit on an integrated circuit is described. The method includes a step to receive a strobe signal from an external source. In addition to that, the method also includes a step to sample logic states of the strobe signal at rising and falling edges of two different clock sampling signals for at least one period, wherein the two different clocks signals are generated within the integrated circuit. The method also includes a step to generate a clock control signal according to sampled logic states.

Further features of the invention, its nature and various advantages will be more apparent from the accompanying drawings and the following detailed description of the preferred embodiments.

DETAILED DESCRIPTION

The following embodiments describe include methods and structures for compensating and tracking process, voltage and temperature variations. It will be obvious, however, to one skilled in the art, that the present exemplary embodiments may be practiced without some or all of these specific details. In other instances, well-known operations have not been described in detail in order not to unnecessarily obscure the present embodiments.

Figure 1:
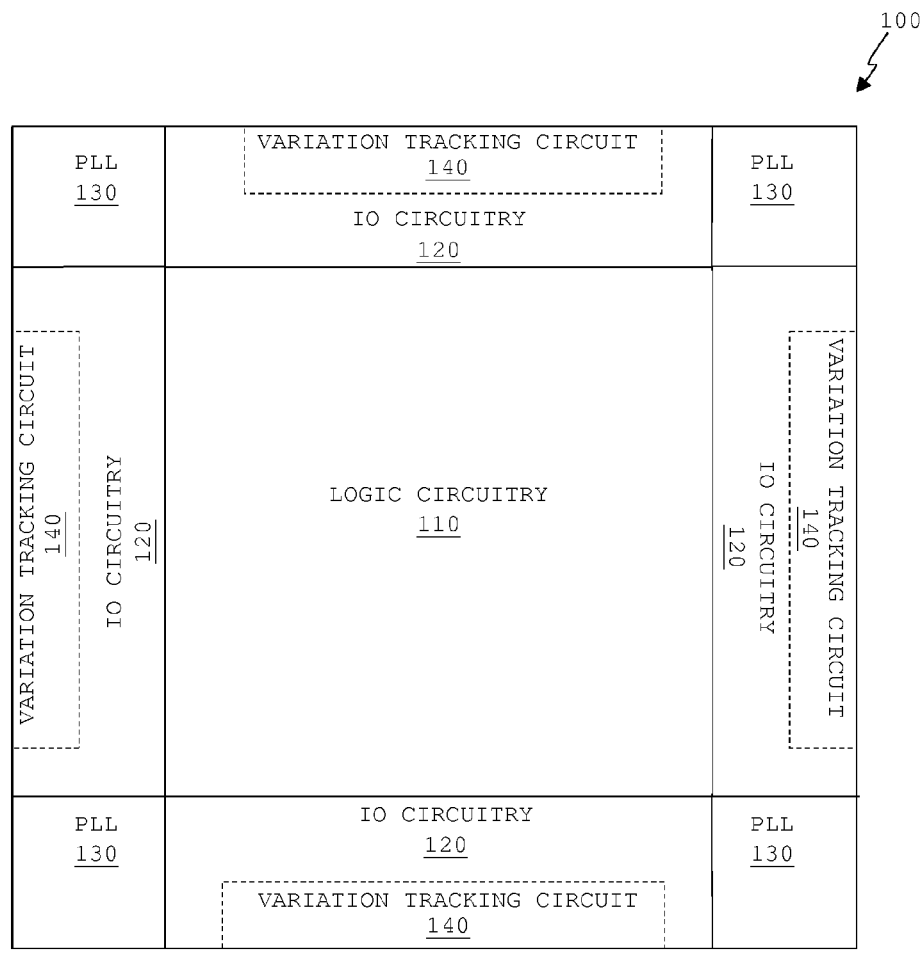
FIG. 1 shows an illustrative integrated circuit in accordance with one embodiment of present invention.

FIG. 1, meant to be illustrative and not limiting, shows an integrated circuit in accordance with one embodiment of present invention. Integrated circuit 100 may be an application specific integrated circuit (ASIC) device, an application standard specific product (ASSP) device or a programmable logic device (PLD). In general, ASIC and ASSP devices may perform fixed and dedicated functions whereas PLD devices may be programmable to perform a variety of functions. An example of a PLD device may be a field programmable gate array (FPGA) device.

Integrated circuit 100 may be a part of a communication system, a processing system, etc. In one embodiment, integrated circuit 100 may be utilized for controlling data transfer between different devices, for example, microprocessor devices and memory devices. In one embodiment, integrated circuit 100 may be utilized for communicating with a memory device. Hence, integrated circuit 100 may include circuits for implementing various protocol standards that allow integrated circuit 100 to communicate with the memory device. In one embodiment, a protocol standard for an external memory interface may be a double data rate (DDR) standard, such as the low power double data rate 2 (LPDDR2) standard.

Integrated circuit 100 may include logic circuitry 110 and a plurality of input-output (IO) circuitry 120. In the embodiment of FIG. 1, the plurality of IO circuitry 120 may be located at the peripheral region of integrated circuit 100 and logic circuitry 110 is located at the center region of integrated circuit 100. It should be appreciated that the arrangement of IO circuitry 120 and logic circuitry 110 on integrated circuit 100 may vary depending on the requirements of a particular device.

Logic circuitry 110 may be utilized for performing core functions of integrated circuit 100. It should be appreciated that logic circuitry 110 may include circuits specific to the functions that define integrated circuit 100. For example, logic circuitry 110 may include circuits to perform memory device addressing and processing of information retrieved from the memory device when integrated circuit 100 is used as a memory controller. In another example, logic circuitry 110 may include programmable logic elements when integrated circuit is a PLD. The programmable logic elements may further include circuits such as look-up table circuitry, multiplexers, product-term logic, registers, memory and the like, as person skilled in the art with the benefit of description of the invention understands. The programmable logic elements may be programmed by a user (e.g., a designer or an engineer) to perform any desired function.

IO circuitry 120 may be known as external interfacing circuitry of integrated circuit 100. IO circuitry 120 may include, among others, read circuitry and write circuitry (both not shown). The read circuitry may be utilized for receiving signals from an external device (i.e., external to integrated circuit 100) and the write circuitry may be utilized for sending signals to an external device.

Given that there is plurality of IO circuitries in FIG. 1, signals from logic circuitry 110 may be transferred out of integrated circuit 100 through any IO circuitry of the plurality of IO circuitries 120. Accordingly, signals received from an external device may be transferred to logic circuitry 110 through any IO circuitry of the plurality of IO circuitries 120.

In the embodiment of FIG. 1, phase-locked loop (PLL) circuits 130 are located at the corners of integrated circuit 100. PLL circuits 130 may be utilized for locking an internal clock signal to on an external clock signal. PLL circuits 130 may also be utilized for generating clock signals with different phases and frequencies. In one embodiment, PLL circuits 130 may be used for synchronizing data communication between integrated circuit 100 and an external memory device (not shown).

In one embodiment, variation tracking circuits 140 may be included in IO circuitry 120. Variation tracking circuits 140 may be utilized for tracking process, voltage and temperature variations in an external device that is coupled with integrated circuit 100. Variation tracking circuits 140 may track PVT variations by sampling a received signal and generating a control signal to adjust appropriate clock signals. In FIG. 1, each IO circuitry 120 includes one variation tracking circuit 140. In one embodiment, variation tracking circuit 140 may be coupled directly to an IO buffer circuit (not shown) in IO circuitry 120.

Figure 2:
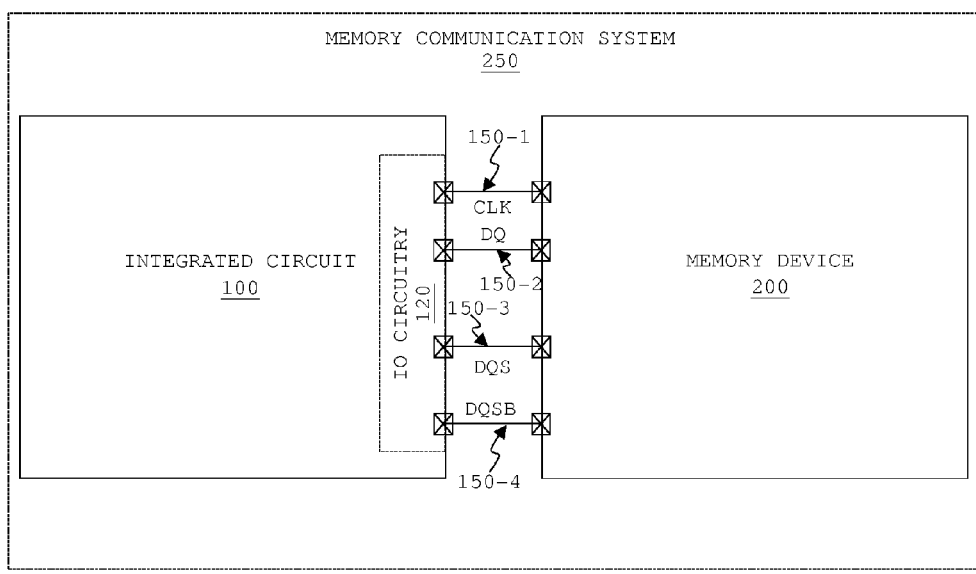
FIG. 2 shows an integrated circuit coupled to a memory device in accordance with one embodiment of the present invention.

FIG. 2, meant to be illustrative and not limiting, shows a memory communication system having an integrated circuit coupled to a memory device in accordance with one embodiment of the present invention. Memory communication system 250 may form part of information processing system circuitry, such as a wireless or wired communication system. Memory communication system 250 includes integrated circuit 100 and memory device 200 coupled together via interconnects 150-1 to 150-4. Memory device 200 in memory communication system 250 may be utilized for storing data or providing data for integrated circuit 100. It should be appreciated that memory device 200 may be a dynamic random access memory (DRAM) device, such as an LPDDR2 DRAM device, a double data rate two (DDR2) DRAM device or a double data rate three (DDR3) DRAM device.

In one embodiment, integrated circuit 100 and memory device 200 may be mounted on a printed circuit board (PCB) (not shown) with a plurality of electrical traces coupling integrated circuit 100 to memory device 200. Alternatively, integrated circuit 100 and memory device 200 may form part of a system-on-package (SOP) or a system-in-package (SiP).

Referring still to FIG. 2, IO circuitry 120 includes a clock (CLK) pin, a data (DQ) pin, a normal data strobe (DQS) pin and a complementary data strobe (DQSB) pin. Accordingly, memory device 200 also includes corresponding CLK pin, DQ pin, DQS pin and DQSB pin. In the embodiment of FIG. 2, the CLK, DQ, DQS and DQSB pins on integrated circuit 100 are coupled respectively to CLK, DQ, DQS and DQSB pins on memory device 200. The coupling between the CLK, DQ, DQS and DQSB pins may include PCB electrical traces, in one embodiment. A person skilled in the art appreciates that an actual connectivity between memory device 200 and integrated circuit 100 may be much more complicated than the one shown in the embodiment of FIG. 2.

The DQ pins, as shown in FIG. 2, may be utilized for transmitting data between integrated circuit 100 and memory device 200. The pathway that couples the DQ pins on memory device 200 and integrated circuit 100 may be a bidirectional pathway that enables data to be transmitted between memory device 200 and integrated circuit 100. In one exemplary embodiment, data may be transmitted from integrated circuit 100 to memory device 200 via the DQ pins when data is being written to memory device 200. Conversely, data may be transmitted from memory device 200 to integrated circuit 100 via both the DQ pins when data is being read from memory device 200.

The respective CLK pins on integrated circuit 100 and memory device 200 may be utilized for transmitting clock (CLK) signals. The CLK signals may be utilized for synchronizing signal transmissions between memory device 200 and integrated circuit 100. It should be appreciated that synchronizing signal transmissions between memory device 200 and integrated circuit 100 enables data to be accurately read from and written to memory device 200. Another clock signal (e.g., an internal clock signal) may be utilized by other circuits (e.g., logic circuitry 110 of FIG. 1) to synchronize signals and circuitry within integrated circuit 100. The internal clock signal may be different than the CLK signal, in one embodiment. For example, the CLK signal may have a clock rate of 300 Mega Hertz (MHz) whereas the internal clock signal may have a clock rate of 500 MHz.

The DQS and DQSB pins on integrated circuit 100 and memory device 200 may be utilized to transmit differential data control signals (e.g., a data control signal (DQS) and a complementary data control signal (DQSB)). It should be appreciated that the data control signals may also be referred to as "strobe" signals. In one instance, the DQS and DQSB signals may be asserted to enable integrated circuit 100 to receive data when reading from memory device 200. The DQS and DQSB signals may be asserted by integrated circuit 100 or by memory device 200 based on the CLK signal, a read command and a write command.

It should be appreciated that a device (e.g., memory device 200) may suffer from process, voltage and temperature (PVT) variations. Variations in process may be due to manufacturing variations. Variations in voltages and temperatures may be related to the variation in operating voltage or current, however, the variation may become significant as the device ages. Therefore, when memory device 200 is affected by PVT variations, the DQ, DQS and DQSB signals transmitted to or received from memory device 200 may be affected. In one instance, the PVT variations may cause an internal clock signal of integrated circuit 100 to be out of synchronization with the data received from memory device 200. This may cause inaccurate sampling of input data.

A PVT tracking circuit can be used to track and compensate for PVT variations to such that the received data can be accurately captures in the presence of PVT variations. The PVT tracking circuit may continuously track changes arising from process, voltage and temperature variations that affect the DQ, DQS and DQSB signals and may accordingly adjust the CLK signals to compensate for any variation is detected. The tracking circuit may be formed within integrated circuit 100. The PVT tracking circuit enables integrated circuit to support a high external memory interface system performance (e.g., interface clock speeds of up to 300 MHz) without being adversely affected by PVT variations. Furthermore, the PVT tracking circuit may support protocols that are sensitive to PVT variations, such as, the LPDDR2 standard.

Figure 3A:
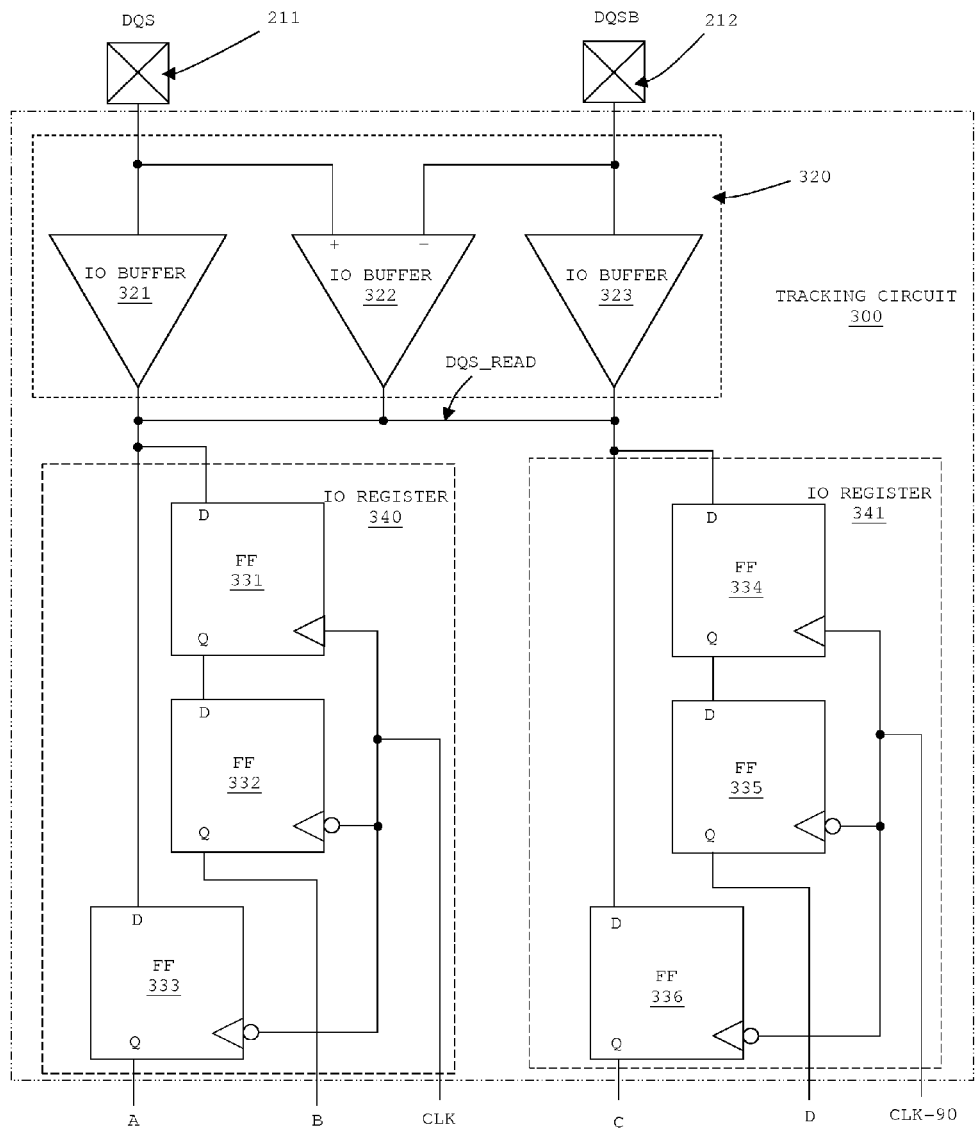
FIG. 3A shows an illustrative implementation of a tracking circuit in accordance with one embodiment of the present invention.

FIG. 3A, meant to be illustrative and not limiting, illustrates an implementation of a PVT tracking circuit in accordance with one embodiment of the present invention. In the embodiment of FIG. 3A, tracking circuit 300 receives two input signals (i.e., DQS and DQSB signals) through the respective DQS and DQSB pins 211 and 212. The DQS and DQSB signals may be received from a memory device (e.g., memory device 200 of FIG. 2). Tracking circuit 300 also receives two out-of-phase clock signals (i.e., CLK and CLK-90 signals). In the embodiment of FIG. 3A, the CLK and CLK-90 signals have a phase difference of 90 degrees with each other. It should be appreciated that the phase differences between clock signals is predetermined by a user of tracking circuit 300. Tracking circuit 300 generates four sampled output (e.g., outputs A, B, C and D) based on the DQS and DQSB signals. In one embodiment, tracking circuit 300 may be located within IO circuitry 120 of FIGS. 1 and 2.

Figure 3B:
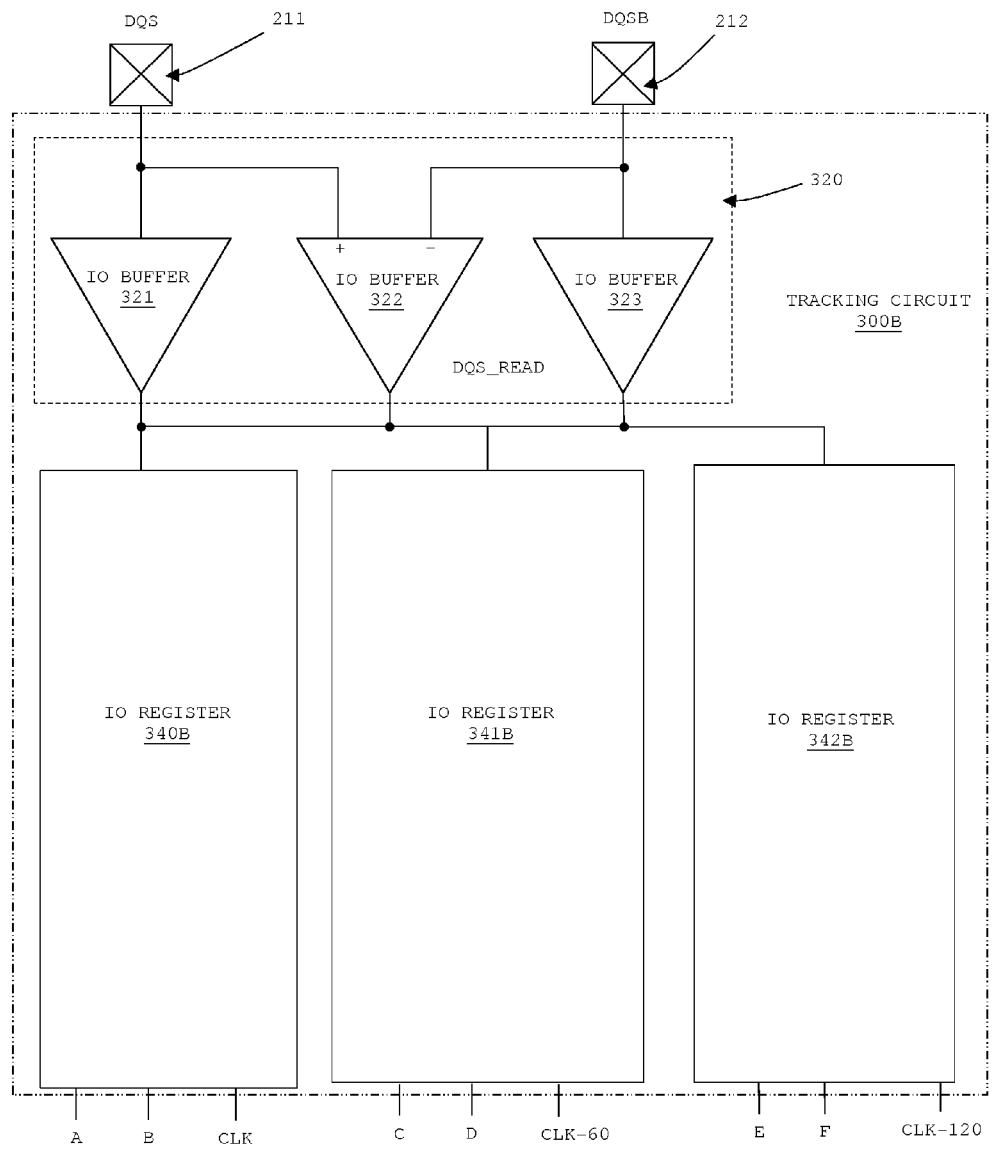
FIG. 3B shows an illustrative tracking circuit that has three IO registers in accordance with one embodiment of the present invention.

Referring still to FIG. 3A, tracking circuit 300 includes IO buffer circuit 322 and two IO register circuits 340 and 341. In one embodiment, the IO buffer circuit 322 can be a stub series-terminated logic (SSTL) interface buffer. It should be appreciated that the methods and structures described herein can be extended to embodiments using more than two IO register circuits (as shown in FIG. 3B). Within IO buffer circuit 320, there may be three IO buffers 321, 322 and 323. IO buffer circuit 320 may be utilized for receiving signals from external devices (external to integrated circuit 100 of FIG. 1). In one embodiment, IO buffer circuit 320 may receive single-ended signals at IO buffers 321 and 323. Alternatively, IO buffer circuit 320 may receive differential signals at IO buffer 322.

In FIG. 3A, IO buffer 322 receives two signals (i.e., DQS and DQSB signals) at its respective input terminals. IO buffer 322 generates an output signal (DQS_READ) based on the difference between DQS and DQSB signals. Hence, DQS_READ signal may also be known as a differential signal. In alternative embodiments, two IO buffer circuits (not shown) can be used to couple DQS and DQSB signals to IO registers 340 and 341, respectively.

IO registers 340 and 341 may be utilized for sampling the DQS_READ signal. Therefore, in one embodiment, IO registers 340 and 341 may also be known as sampling buffer circuits. Each IO register receives a DQS_READ signal that is output from the IO buffer 322, and produces two sampled outputs, where the first sampled output is obtained as a result sampling DQS_READ signal at the rising edge of a corresponding sampling clock signal (i.e., CLK and CLK-90 for IO registers 340 and 341, respectively) and second sampled output is obtained as a result of sampling DQS_READ signal at the falling edge of the corresponding sampling clock signal. To enable the sampling of the DQS_READ signal, IO registers 340 and 341 may include flip-flops, such as flip-flops 331-336. In one embodiment, flip-flops 331-336 in the respective IO register circuits 340 and 341 may be arranged similarly to the one shown in the embodiment of FIG. 3A.

For example, the D-terminals of flip-flops 331, 333, 334 and 336 may be coupled to output terminals of IO buffer circuit 320. Therefore, the D-terminals of flip-flops 331, 333, 334 and 336 may receive the DQS_READ signal. Alternatively, D-terminals of flip-flops 332 and 335 may be coupled to the Q-terminals of the respective flop-flops 331 and 334. Hence, output signals from flip-flops 331 and 334 may be transmitted to respective flip-flops 332 and 335. Sampled outputs A, B, C and D may be transmitted out of the respective Q-terminals of flip-flops 333, 332, 336 and 335.

In addition, each of the IO registers 340 and 341 may also receive a sampling clock signal, i.e., the CLK and CLK-90 signals, respectively. As shown in the embodiment of FIG. 3A, flip-flop 331 receives the CLK signal and flip-flops 332 and 333 receive an inverted version of the CLK signal at their respective clock terminals. Similarly, flip-flop 334 receives the CLK-90 signal whereas flip-flops 335 and 336 receive an inverted version of the CLK-90 signal at their respective clock terminals.

IO registers 340 and 341 may transmit the DQS_READ signal through the respective flip-flops 331-336 based on the rising and falling edges of the CLK and CLK-90 signals. For example, within IO register circuit 340, the DQS_READ signal may be transmitted through flip-flop 331 at a rising edge (i.e., logic shifting from logic '0' to logic '1') of the CLK signal. The DQS_READ signal may be transmitted through flip-flop 333 at a falling edge (i.e., logic shifting from logic '1' to logic '0') of the CLK signal. Within IO register circuit 341, the DQS_READ signal may be transmitted through flip-flop 334 at a positive edge of the CLK-90 signal. Similarly, the DQS_READ signal may be transmitted through flip-flop 336 at a negative edge of the CLK-90 signal. Once the DQS_READ signal gets transmitted through flip-flops 331 and 334, the DQS_READ signal may be further transmitted through flip-flop 332 at a next negative edge of the CLK signal and through flip-flop 335 at a next negative edge of the CLK-90 signal.

In one embodiment, the propagation of DQS_READ signal generates two sampled output signals from each IO buffer (i.e., an output A from flip-flop 333 and an output B from flip-flop 332 for IO buffer 340, and an output C from flip-flop 336 and an output D from flip-flop 337 for IO buffer 341). The outputs A, B, C and D indicate logic states of the DQS_READ signal at different times (details of which will be explained further with reference to FIGS. 4 and 5). Therefore, the outputs A, B, C and B may indicate whether the DQS_READ signal is lagging behind or leading the respective sampling clocks CLK and CLK-90.

FIG. 3B, meant to be illustrative and not limiting, illustrates a tracking circuit that includes three IO registers in accordance with one embodiment of the present invention. Tracking circuit 300B may be similar to tracking circuit 300 of FIG. 3A, however with three IO registers 340B, 341B and 342B. In one embodiment, IO registers 340B, 341B and 342B may have similar circuit elements to IO registers 340 and 341 of FIG. 3A. In addition to that, IO buffers 321, 322 and 323 and DQS and DQSB pins 211 and may be similar to IO buffers 321, 322 and 323 and DQS and DQSB pins 211 of FIG. 3A. Therefore, for the sake of brevity, the details of the elements will not be described in here again.

It should be appreciated that increasing the number of IO register circuits typically results in higher accuracy for PVT tracking and compensation. In one embodiment, the three IO registers 340B, 341B and 342B (instead of the two IO register circuits 340 and 341 of FIG. 2) may be supplied with three out-of-phase clock signals (instead of only two out-of-phase clock, i.e., CLK and CLK-90 signals). The embodiment with the three IO registers 340B, 341B and 342B are utilized when a signal to be tracked has a frequency that is at least twice or more compared to the frequency of an internal clock signal. The out-of-phase clocks in the three IO registers 340B, 341B and 342B may be out-of-phase by 60 degrees. For example, IO register 340B may receive a CLK signal, IO register 341B may receive a CLK-60 signal (i.e., the CLK signal offset by 60 degrees) and IO register 342B may receive a CLK-120 signal (i.e., the CLK signal offset by 120 degrees). The three out-of-phase clock signals may enable tracking circuit 300B sample more frequently (or the sampling occurs at a smaller duration). Therefore, the embodiment with three IO registers 340B, 341B and 342B may have a higher sampling rate than the tracking circuit 300 of FIG. 3A. In addition to that, tracking circuit 300B may generate six outputs, i.e., outputs A, B, C, D, E and F (unlike tracking circuit 300 of FIG. 3A that generates four output A, B, C and D).

Figure 4:
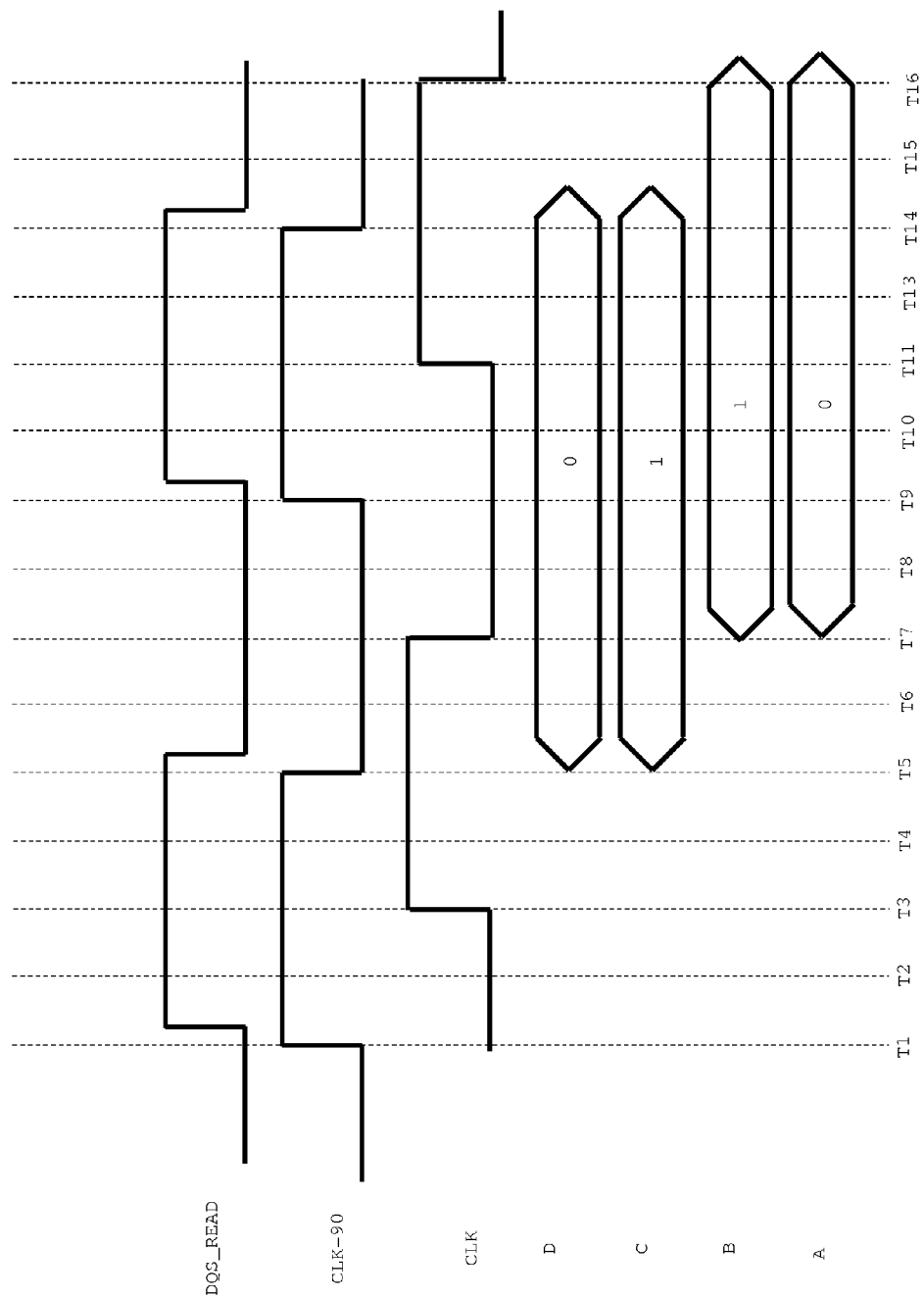
FIG. 4 shows illustrative waveform when a DQS_READ signal is lagging behind a CLK-90 signal in accordance with one embodiment of the present invention.

FIG. 4, meant to be illustrative and not limiting, illustrates waveform 400 that shows outputs A, B, C and D when the DQS_READ signal lags behind the CLK-90 signal (i.e., the transitions of the DQS_READ signal occur after the corresponding transitions of the CLK-90 signal), in accordance with one embodiment of the present invention. In one embodiment, outputs A, B, C and D shown in waveform 400 are the sampled states of the DQS_READ signal as it is processed by the PVT tracking circuit 300 of FIG. 3A. As such, waveform 400 may be described in detail with reference to tracking circuit 300 of FIG. 3A. In one embodiment, the duration between T1-T2, T2-T3 and so on may be 0.625 nanoseconds (ns), when the CLK signal has a frequency of 200 megahertz (MHz).

In the embodiment of FIG. 4, the CLK-90 signal transitions from logic zero (i.e., logic '0') to logic one (i.e., logic '1') at T1, while the DQS_READ signal transitions from logic zero to logic one after T1 (but before T2). Accordingly, this may indicate that the DQS_READ signal is lagging behind the CLK-90 signal.

At T1, the DQS_READ signal is at logic zero. Hence, a logic zero is received by flip-flop 335 from flip-flop 334. At time T2, the DQS_READ signal transitions from logic zero to logic one. At time T3, the logic one may be transmitted to flip-flop 332 from flip-flop 331.

The DQS_READ signal remains at logic one during the time duration from T3 to T4, and T4-T5. Flip-flop 336 outputs a logic one as output C because flip-flop 336 receives a logic '1' signal at the falling edge of the CLK-90 signal (i.e., DQS_READ signal is at logic '1' at falling edges of CLK-90 signal). DQS_READ is at logic zero at the first rising edge of CLK-90 (at time T1), therefore, flip-flop 334 outputs a logic zero, which is transmitted to flip-flop 335. Hence, at the falling edge of CLK-90 right after that (at time T5), flip-flop 335 outputs a logic zero as output D (because flip-flop 335 received and is still receiving a logic zero from flip-flop 334).

At time T6, the DQS_READ signal transitions from logic one to logic zero. The DQS_READ signals remains at logic zero during the time duration from T7 to T8, and T8-T9. Flip-flop 333 outputs a logic zero as output A because flip-flop 333 receives a logic '0' signal at the falling edge of the CLK signal (i.e., DQS_READ signal is at a logic '0' level at falling edges of the CLK signal). DQS_READ is at logic one at the first rising edge of CLK (at time T3), therefore, flip-flop 331 outputs logic one, which is transmitted to flip-flop 332. Hence, at the falling edge of CLK right after that (at time T7), flip-flop 332 outputs a logic one as output B (because flip-flop 332 received and is still receiving a logic one from flip-flop 331).

Figure 5:
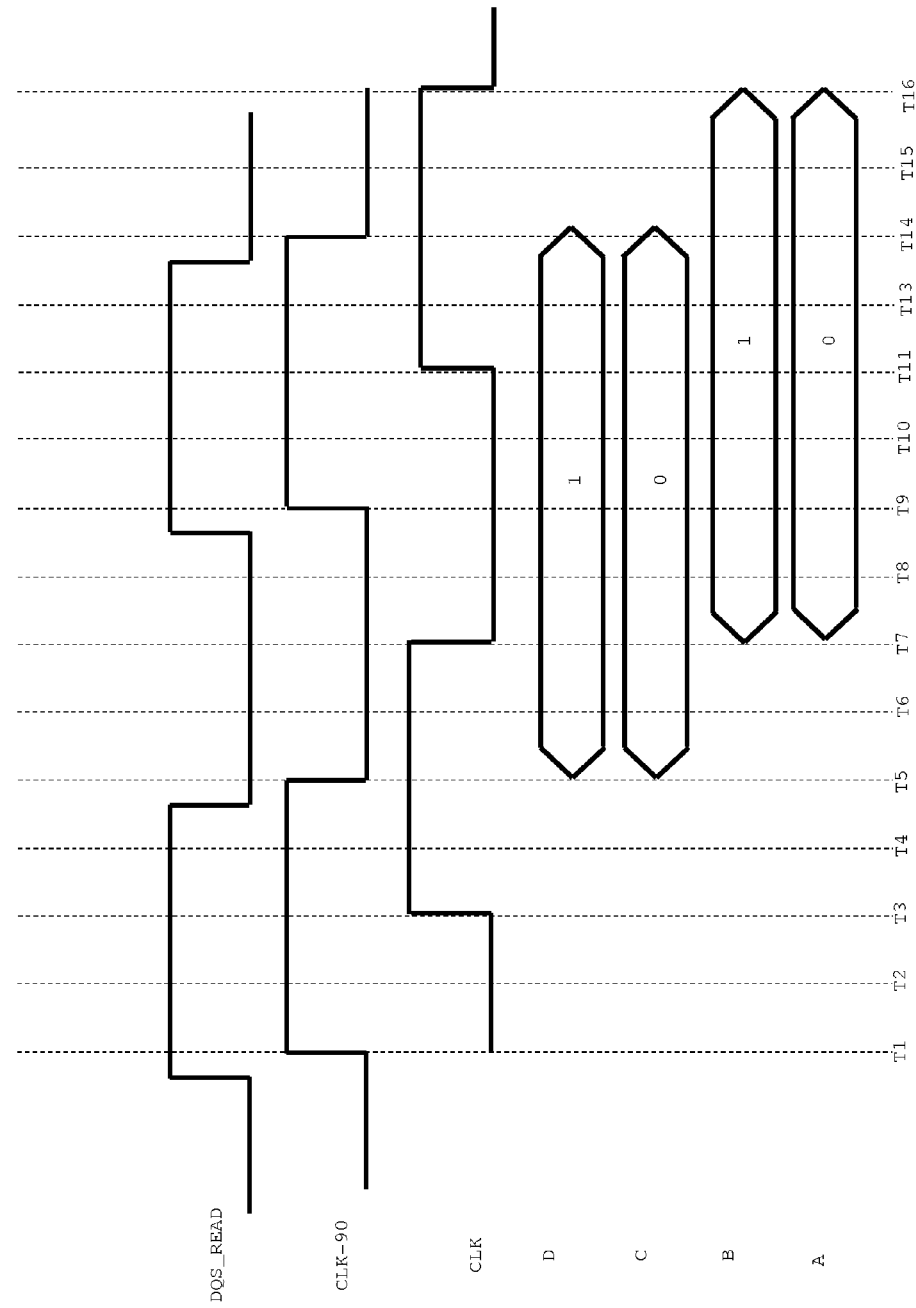
FIG. 5 shows illustrative waveform when a DQS_READ signal is leading a CLK-90 signal in accordance with one embodiment of the present invention.

FIG. 5, meant to be illustrative and not limiting, illustrates waveform 500 that shows outputs A, B, C and D when the DQS_READ signal is ahead of the CLK-90 signal in accordance with one embodiment of the present invention. Similar to waveform 400 of FIG. 4, outputs A, B, C and D shown in waveform 500 may be the sampled states of the DQS_READ signal as it travels through tracking circuit 300 of FIG. 3A. In the embodiment of FIG. 5, the CLK-90 signal transitions from logic zero to logic one at T1, while the DQS_READ signal transitions from logic zero to logic one before time T1. Therefore, in one embodiment, this may indicate that the DQS_READ signal is ahead of the CLK-90 signal.

At T1, the DQS_READ signal is at logic one. Hence, a logic one is transmitted to flip-flop 335 from flip-flop 334. At T2, the DQS_READ signal remains at logic one continuous to remain at logic one until T4. At time T3, the DQS_READ signal remains at logic one. Hence, the logic one may be transmitted to flip-flop 332 from flip-flop 331.

At T5, the DQS_READ signal has complete its transition from logic one to logic zero, remains at logic zero until T8. Flip-flop 336 outputs a logic zero as output C because flip-flop 336 receives a logic '0' signal at the falling edge of the CLK-90 signal (i.e., DQS_READ signal is at a logic '0' level at falling edges of CLK-90 signal). DQS_READ is at logic one at the first rising edge of CLK-90 (at time T1), therefore, flip-flop 334 outputs logic one, which is transmitted to flip-flop 335. Hence, at the falling edge of CLK-90 right after that (at time T5), flip-flop 335 outputs a logic one as output D (because flip-flop 335 received and is still receiving a logic one from flip-flop 334).

At T7, flip-flop 333 outputs a logic zero as output A because flip-flop 333 receives a logic '0' signal at the falling edge of the CLK signal (i.e., DQS_READ signal is at a logic '0' level at falling edges of the CLK signal). DQS_READ is at logic one at the first rising edge of the CLK signal (at time T3), therefore, flip-flop 331 outputs a logic one, which is transmitted to flip-flop 332. Hence, at the falling edge of the CLK signal right after that (at time T7), flip-flop 332 outputs a logic one as output B (because flip-flop 332 received and is still receiving a logic one from flip-flop 331).

It should be noted that depending on circuit arrangement of a tracking circuit, for example circuit arrangement of tracking circuit 300 of FIG. 3A, the tracking circuit may generate different sampled outputs for different skews of the DQS_READ signal, and therefore, enables the detection and tracking of DQS_READ signals skews resulting from PVT variations in the integrated circuit. As shown in the examples of FIGS. 4 and 5, the outputs A, B, C and D may have respective logic values of [0, 1, 1, 0] in response to determining that the DQS_READ signal lags behind the CLK-90 signal but leads the CLK signal, or may have respective logic values of [0, 1, 0, 1] in response to determining that the DQS_READ signal leads the CLK-90 and CLK signals. As another example (not shown) the outputs A, B, C and D may have a respective logic value of [1, 0, 1, 0] when the DQS_READ signal lags behind the CLK-90 and CLK signals (e.g., when the rising edges of DQS_READ signal is after then rising edges of the CLK-90 and CLK signals). Hence, signal skews may be tracked with tracking circuit 300 of FIG. 3A. In one embodiment, the tracking circuit 300 can be used to track signal skews resulting from PVT variations of the integrated circuit.

It should be appreciated that in the embodiment with more than two IO buffer circuits and more than two out-of-phase clocks, the logic values for the outputs may differ. This is because there may be more than four output signals. For example, there may be six output signals when using three IO buffer circuits and three out-of-phase clocks.

Figure 6:
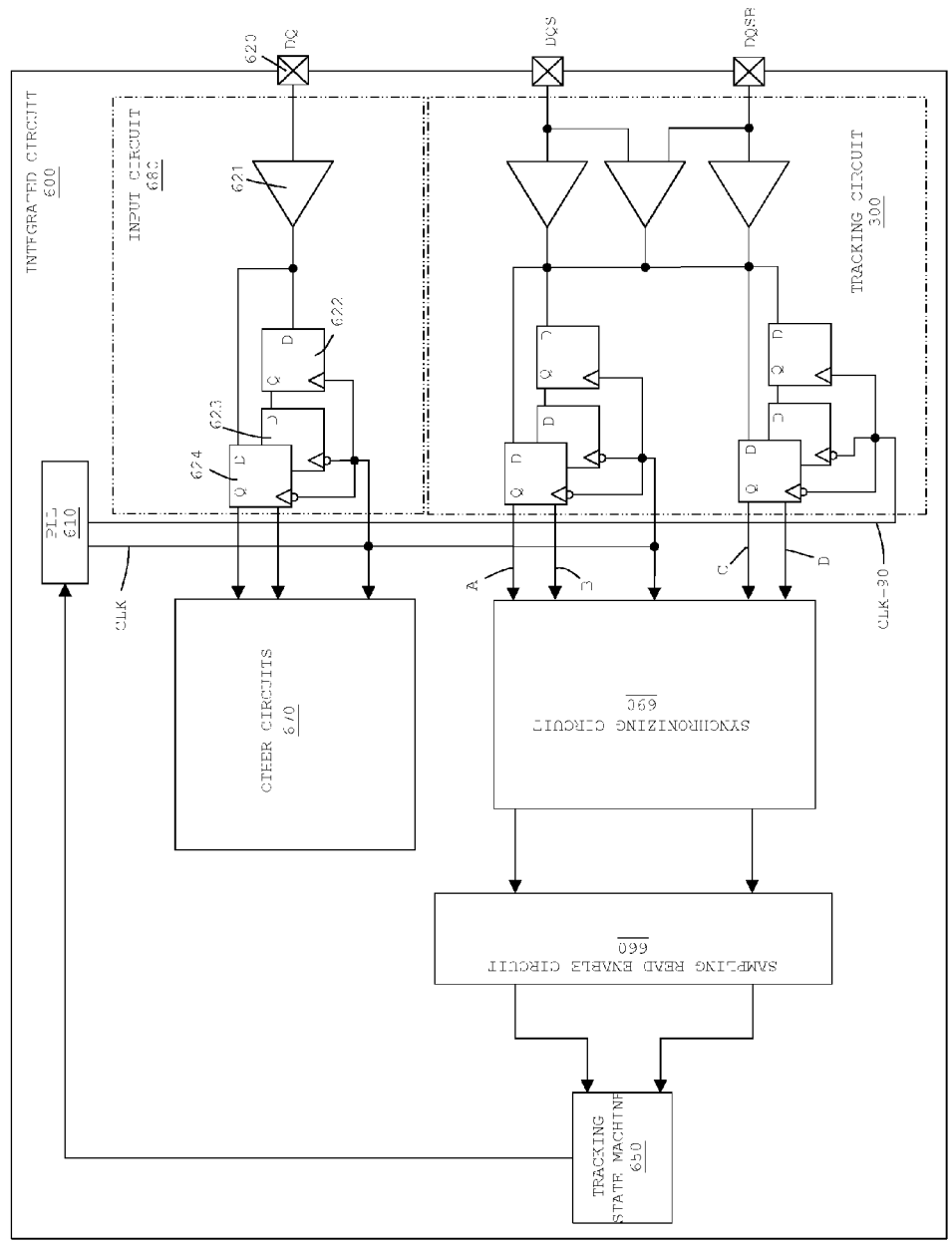
FIG. 6 shows tracking circuit and DQ circuit on an integrated circuit in accordance with one embodiment of the present invention.

FIG. 6, meant to be illustrative and not limiting, illustrates a tracking circuit and an input circuit within an integrated circuit in accordance with one embodiment of the present invention. Integrated circuit 600 may be similar to integrated circuit 100 of FIGS. 1 and 2. Integrated circuit 600 includes tracking circuit 300 and input circuit 680. Tracking circuit 300 may be similar to tracking circuit 300 of FIG. 3A. Input circuit 680 may be utilized for reading data received from a memory device (e.g., memory device 200 of FIG. 2).

Referring still to FIG. 6, the data may be transmitted to IO buffer 621 through DQ pin 620. Subsequently, the data gets transmitted through flip-flops 622, 623 and 624. The arrangement of flip-flops 622, 623 and 624 may be similar to the arrangement of flip-flops 331, 332 and 333 of FIG. 3A, and therefore for the sake of brevity, the manner in which the data gets sampled in flip-flops 622, 623 and 624 will not be repeated.

In one embodiment, input circuit 680 operates according to a CLK signal generated by PLL 610 (i.e., the propagation of DQ signal through the input circuit 680 is based on the rising/falling edge of the CLK signal). It should be appreciated that if the data and CLK signal are not synchronized, then input circuit 680 may not be able to capture the data received at DQ pin 620. The data may be transmitted from input circuit 680 to other circuits 670 (e.g., logic circuitry 110 of FIG. 1) within integrated circuit 600.

In FIG. 6, PLL 610, tracking state machine 650, sampling read enable circuit 660 and synchronizing circuit 690 may be utilized for processing the sampled outputs A, B, C and D. In one embodiment, synchronizing circuit 690 synchronizes the outputs A, B, C and D to an internal clock (e.g., as described in FIG. 1, internal clock signal frequency of 500 MHz) so that further processing may be performed on the outputs. In the embodiment shown, the sampling read enable circuit 660 prevents the transmission of the synchronized sampled outputs A, B, C and D to tracking state machine 650 other than during the read mode, thereby enabling the PVT tracking capability selectively during memory read operations. In alternative embodiments, the synchronized sampled outputs can be provided to the tracking state machine during other predetermined modes, or time durations. In certain embodiments, the synchronized sampled outputs can be provided to the tracking state machine continuously, intermittently, or during user specified time intervals, such that PVT tracking is performed continuously, intermittently, or during user specified time intervals, respectively. Tracking state machine 650 may subsequently process the outputs A, B, C and D to determine whether PLL 610 needs to delay or advance the CLK signal. Accordingly, PLL 610 receives a control signal from tracking state machine 650 and may either delay or advance the CLK signal based on the control signal received.

Tracking state machine 650 may process the received outputs from synchronizing circuit 690 and may generate a control signal for PLL 610. In one embodiment, tracking state machine 650 may include at least two different states that to generate two types of control signals. Tracking state machine 650 may generate a control signal to delay or advance the CLK and CLK-90 signals based on outputs A, B, C and D. For example, tracking state machine 650 may generate a control signal to delay the CLK and CLK-90 signals in response to determining that outputs A, B, C and D are at logic levels 0, 1, 1 and 0, respectively. Alternatively, tracking state machine 650 may generate a control signal to advance the CLK and CLK-90 signals in response to determining that outputs A, B, C and D are at logic levels 0, 1, 0 and 1, respectively.

Referring still to FIG. 6, the control signal generated by tracking state machine 650 is supplied to PLL 610. In one embodiment, PLL 610 may be similar to PLL 130 of FIG. 1. PLL 610 may adjust the CLK and CLK-90 signals according to the received control signals.

In one embodiment, synchronizing circuitry 690, sampling read enable circuit 660 and tracking state machine 650 may be implemented on an integrated circuit as a hardened logic circuit or as a soft logic circuit (e.g., using programmable logic elements). Synchronizing circuitry 690, sampling read enable circuit 660 and tracking state machine 650 may be flexible if implemented as soft logic circuitry, as the soft logic circuitry is configurable according to user inputs.

Figure 7:
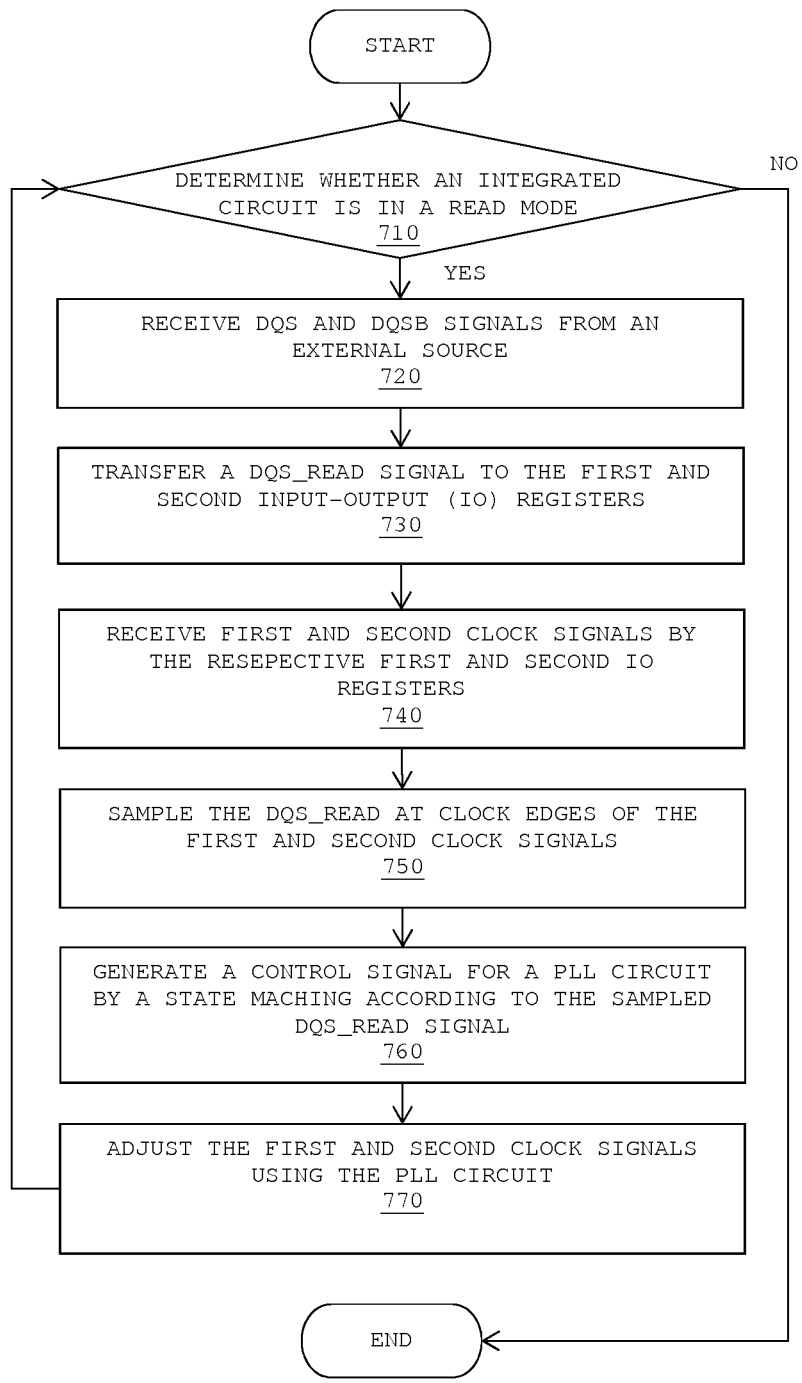
FIG. 7 shows a flowchart of a method to operate a tracking circuit in accordance with one embodiment of the present invention.

FIG. 7, meant to be illustrative and not limiting, illustrates a method of operating a tracking circuit in accordance with one embodiment of the present invention. The tracking circuit may be similar to tracking circuit 300 of FIG. 3A. The tracking circuit may be a circuit within integrated circuit 100 of FIGS. 1 and 2 that is coupled to a memory device (e.g., memory device 200 of FIG. 2).

At step 710, the integrated circuit is determined if it is in a read mode. In one embodiment, the determination may be performed by a memory controller formed within the integrated circuit. It should be appreciated that integrated circuit may be in a read mode when data is to be read from the memory device. Conversely, the integrated circuit may be in a write mode when data is to be written to the memory device. Once the integrated circuit is determined to be in either the read or write mode, a control signal is supplied to a read enable circuit (e.g. sampling read enable circuit 660 of FIG. 6). In one embodiment, the read enable circuit transmits signals received from a tracking circuit (e.g., tracking circuit 300 of FIG. 6) based on the control signal.

The method continues to step 720 when the integrated circuit is in the read mode. At step 720, the DQS and DQSB signals may be received from a memory device. The DQS and DQSB signals may be similar to the DQS and DQSB signals referred to in FIG. 3A. It should be appreciated that the DQS and DQSB signals may be received by the integrated circuit at its respective DQS and DQSB pins (e.g., DQS and DQSB pins 221 and 222 of FIG. 3A). A DQS_READ signal may be generated from the DQS and DQSB signals by IO buffer 323 (as shown in FIG. 3A).

At step 730, the DQS_READ signal may be transferred to first and second IO registers within the tracking circuit. At step 740, first and second clock signals may be supplied to the respective first and second IO registers. In one embodiment, the first and second IO registers may be similar to IO registers 341 and 342 and the first and second clock signals may be similar to the CLK and CLK-90 signals of FIG. 3A. The first and second clock signals may have a phase difference of 90 degrees.

At step 750, the DQS_READ signal may be sampled. The DQS_READ signal may be sampled at clock edges of the first and second clock signals. In one embodiment, there may be four outputs (e.g., outputs A, B, C and D of FIG. 3A) generated based on the sampling of the DQS_READ signal at different clock edges. The four outputs may be generated by flip-flops 331-336 of FIG. 3A. In one embodiment, the sampled output may have a logical values of [0, 1, 1, 0] in response to determining that the DQS_READ signal lags relative to the first clock signal. Alternatively, the sampled output may have a logical values of [0, 1, 0, 1] in response to determining that the DQS_READ signal leads relative to the first clock signal.

At step 760, a PLL control signal may be generated by a state machine based on the sampled DQS_READ signal. The PLL control signal may be supplied to a PLL circuit. In one embodiment, the state machine and the PLL circuit may be similar to respective tracking state machine 650 and PLL 610 of FIG. 6. The control signal may configure the PLL circuit to either advance or delay the first and second clock signals. At step 770, the first and second clock signals are adjusted according to the PLL control signal. After step 770, the method may return to step 710 and steps 710-760 may be repeated until the integrated circuit is no longer in read mode.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA® Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Although the foregoing invention has been described in some detail for the purposes of clarity, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A clock synchronizing circuit on an integrated circuit, wherein the integrated circuit receives a data signal and an associated data strobe signal for validating the data signal, comprising:
 an input-output buffer that receives the associated data strobe signal and that generates a corresponding output data strobe signal; and
 a plurality of sampling buffer circuits, each of which receives the output data strobe signal and a respective sampling clock signal, outputs a first sampled output by sampling the output data strobe signal at rising edges of the sampling clock signal, and outputs a second sampled output by sampling the output data strobe signal on falling edges of the sampling clock signal, wherein there is a predetermined phase difference between the sampling clock signals received at each of the plurality of sampling buffer circuits.

2. The clock synchronizing circuit as defined in claim 1, wherein a first sampling buffer circuit in each of the plurality of sampling buffer circuits receives a first sampling clock signal, and wherein a second sampling buffer circuit in each of the plurality of sampling buffer circuits receives a second sampling clock signal.

3. The clock synchronizing circuit as defined in claim 2, wherein the first sampling clock signal is 90 degrees out-of-phase with respect to the second sampling clock signal.

4. The clock synchronizing circuit as defined in claim 2, wherein a third sampling buffer circuit in the plurality of sampling buffer circuits is coupled to the input-output buffer to receive the output data strobe signal, wherein the third sampling buffer circuit receives a third sampling clock signal, and wherein the second and third sampling clock signals are out-of-phase by 60 degrees and 120 degrees, respectively, with respect to the first sampling clock signal.

5. The clock synchronizing circuit as defined in claim 1, wherein the input-output buffer comprises a differential buffer.

6. The clock synchronizing circuit as defined in claim 5, wherein the input-output buffer comprises two input terminals that receive a true data strobe signal and a complement data strobe signal, and an output on which a difference between the normal and complement data strobe signals is provided as the output data strobe signal.

7. The clock synchronizing circuit as defined in claim 1, wherein each sampling buffer circuit in the plurality of sampling buffer circuits comprises:
 first and second flip-flops coupled in series, wherein the first flip-flop receives the output data strobe signal and a first sampling clock signal, and wherein the second flip-flop receives an output of the first flip-flop and an inverted version of the first sampling clock signal; and a third flip-flop that is coupled in parallel to the first and second flip-flops, wherein the third flip-flop receives the output data strobe signal and the inverted version of the first sampling clock signal.

8. The clock synchronizing circuit as defined in claim 1, further comprising:

a state machine circuit that is coupled to the first and second sampled outputs of the sampling buffer circuits, wherein the state machine circuit identify patterns of the first and second sampled outputs of the plurality of sampling buffer circuits and generates a control signal, wherein the control signal synchronizes the output data strobe signal to a predetermined clock edge of the sampling clock signal received at the plurality of sampling buffer circuits.

9. A method of operating a clock synchronizing circuit on an integrated circuit, comprising:

receiving a data signal;

receiving a data strobe signal for capturing the data signal at input terminals of a sampling buffer circuit;

receiving sampling clock signals the sampling buffer circuit, wherein the sampling clock signals are out-of-phase with respect to one another; and sampling the data strobe signal at rising and falling edges of the corresponding sampling clock signal at the sampling buffer circuit.

10. The method as defined in claim 9, wherein a first sampling clock signal is 90 degrees out-of-phase with respect to a second sampling second clock signal.

11. The method as defined in claim 10, further comprising:

determining positions of rising and falling edges of the data strobe signal from sampled outputs of the strobe signal.

12. The method as defined in claim 11, further comprising:

in response to determining that a rising edge of the second sampling clock signal is before a rising edge of the data strobe signal, generating a clock control signal to delay a first sampling clock signal.

13. The method as defined in claim 11, further comprising:

in response to determining that a rising edge of the second clock sampling signal is after a rising edge of the data strobe signal, generating a clock control signal to advance a first sampling clock signal.

14. The method as defined in claims 12 or 13, further comprising:

when the clock control signal is to delay the first sampling clock signal, delaying the first and second sampling clock signals; and when the clock control signal is to advance the first sampling clock signal, advancing the first and second sampling clock signals.

15. The method as defined in claim 11, wherein receiving the data strobe signal comprises receiving the data strobe signal from external memory.

16. A method of operating a clock synchronizing circuit on an integrated circuit, comprising:

receiving a data capture strobe signal from an external source;

sampling logic states of the data capture strobe signal at rising and falling edges of two different clock sampling signals, wherein the two different clock sampling signals are generated within the integrated circuit; and generating a clock control signal according to the sampled logic states.

17. The method as defined in claim 16, further comprising:

comparing the sampled logic states of the data capture strobe signal to predefined logic states; and determining whether the two different clock sampling signals are leading or lagging relative to their expected timings.

18. The method as defined claim 17, further comprising:

in response to determining that the two different sampling clock signals are leading relative to the expected timings, delaying the two different sampling clock signals.

19. The method as defined in claim 17, further comprising:

in response to determining that the two different sampling clock signals are lagging relative to the expected timings, advancing the two different sampling clock signals.

20. The method as defined in claim 16, wherein two different sampling clock signals are out-of-phase by 90 degrees.

* * * * *